(12) United States Patent
Hwang

(10) Patent No.: US 11,688,542 B2
(45) Date of Patent: Jun. 27, 2023

(54) WIRELESS POWER TRANSMISSION DEVICE FOR VEHICLE

(71) Applicant: AMOGREENTECH CO., LTD., Gimpo-si (KR)

(72) Inventor: Seung Jae Hwang, Incheon (KR)

(73) Assignee: AMOGREENTECH CO.. LTD., Gimpo-si (KR)

( * ) Notice: Subject to any disclaimer, the term of this patent is extended or adjusted under 35 U.S.C. 154(b) by 71 days.

(21) Appl. No.: 16/629,437

(22) PCT Filed: Jul. 12, 2018

(86) PCT No.: PCT/KR2018/007903
§ 371 (c)(1),
(2) Date: Jan. 8, 2020

(87) PCT Pub. No.: WO2019/017646
PCT Pub. Date: Jan. 24, 2019

(65) Prior Publication Data
US 2020/0161040 A1 May 21, 2020

(30) Foreign Application Priority Data

Jul. 17, 2017 (KR) .......................... 10-2017-0090413
Jul. 11, 2018 (KR) .......................... 10-2018-0080586

(51) Int. Cl.
*H01F 27/02* (2006.01)
*H02J 50/40* (2016.01)
(Continued)

(52) U.S. Cl.
CPC ........... *H01F 27/025* (2013.01); *H01F 27/08* (2013.01); *H01F 27/2871* (2013.01);
(Continued)

(58) Field of Classification Search
CPC .. H02J 50/12; H02J 50/40; H02J 50/90; H02J 50/80; H02J 7/00034; H02J 5/005;
(Continued)

(56) References Cited

U.S. PATENT DOCUMENTS

| 2013/0038279 | A1* | 2/2013 | Seyerle | ................. B60R 16/033 320/108 |
| 2014/0376191 | A1* | 12/2014 | Hwang | .................. F28F 13/18 361/720 |

(Continued)

FOREIGN PATENT DOCUMENTS

| EP | 1962305 | 8/2008 |
| EP | 3460813 | 3/2019 |

(Continued)

OTHER PUBLICATIONS

International Search Report—PCT/KR2018/007903 dated Oct. 15, 2018.

(Continued)

*Primary Examiner* — Elim Ortiz
(74) *Attorney, Agent, or Firm* — Cantor Colburn LLP

(57) ABSTRACT

A wireless power transmission device for a vehicle is provided. A wireless power transmission device for a vehicle includes: a wireless power transmission module including at least one wireless power transmission antenna for transmitting wireless power, and a magnetic field shielding sheet arranged on one surface of the wireless power transmission antenna; a radiation case having one side to which the wireless power transmission module is coupled, having at least one circuit board embedded therein so as to drive the wireless power transmission module, and radiating heat generated by a heat source; a radiation plate arranged between the wireless power transmission module and the radiation case, and dispersing heat generated in the wireless power transmission antenna; an insulating layer arranged on
(Continued)

one surface of the radiation plate so as to block thermal transferring between the radiation case and the radiation plate; and a cover detachably coupled to the radiation case.

8 Claims, 5 Drawing Sheets

(51) Int. Cl.
*H02J 50/70* (2016.01)
*H01F 27/08* (2006.01)
*H02J 50/10* (2016.01)
*H01F 27/28* (2006.01)
*H01F 38/14* (2006.01)
*H01F 27/36* (2006.01)
*B60L 1/00* (2006.01)

(52) U.S. Cl.
CPC ............ *H01F 27/36* (2013.01); *H01F 27/366* (2020.08); *H01F 38/14* (2013.01); *H02J 50/10* (2016.02); *H02J 50/402* (2020.01); *H02J 50/70* (2016.02); *B60L 1/006* (2013.01)

(58) Field of Classification Search
CPC ........ H02J 50/402; H02J 50/005; H02J 50/00; H02J 7/0027; H02J 7/007; H02J 7/00309; H02J 50/70; H02J 7/00334; H02J 7/00302; H02J 7/00304; H02J 7/00; H02J 7/0029; H01Q 1/526; H05K 9/00; H05K 9/0007; H05K 9/0015; H05K 9/0026; H05K 9/0029; H05K 9/003; H05K 9/0031; H05K 9/0039; H05K 9/0045; H05K 9/004; H01F 27/025; H01F 27/08

USPC .................. 307/104; 361/659, 660, 661, 662
See application file for complete search history.

(56) References Cited

U.S. PATENT DOCUMENTS

| | | | |
|---|---|---|---|
| 2015/0326056 A1 | 11/2015 | Koyanagi et al. | |
| 2017/0308188 A1* | 10/2017 | Hayashi | G06F 3/03543 |
| 2020/0235593 A1* | 7/2020 | Jang | H02J 50/80 |

FOREIGN PATENT DOCUMENTS

| | | |
|---|---|---|
| JP | 2007252027 | 9/2007 |
| JP | WO2011132748 | 7/2013 |
| JP | 2017070020 | 4/2017 |
| JP | 2017093043 | 5/2017 |
| KR | 101690500 | 12/2016 |
| KR | 20160149967 | 12/2016 |
| KR | 20170010736 | 2/2017 |
| KR | 20170010868 | 2/2017 |
| KR | 20170011106 | 2/2017 |
| KR | 101733579 | 5/2017 |
| KR | 101757204 | 7/2017 |
| KR | 20170076510 | 7/2017 |
| WO | 2015065117 | 5/2015 |

OTHER PUBLICATIONS

Japanese Office Action—Japanese Application No. 2020-501813 dated May 25, 2021, citing KR 1733579, KR 2017-0011106, JP 2017-070020, WO 2011/132748, KR 1690500, JP 2017-093043, and JP 2007-252027.

* cited by examiner

WIRELESS POWER TRANSMISSION DEVICE FOR VEHICLE

CROSS-REFERENCE TO RELATED APPLICATIONS

This application is a national entry of PCT Application No. PCT/KR2018/007903 filed on Jul. 12, 2018, which claims priority to and the benefit of Korean Application No. 10-2017-0090413 filed on Jul. 17, 2017; and Korean Application No. 10-2018-0080586 filed Jul. 11, 2018, in the Korean Patent Office, the entire contents of which are incorporated herein by reference.

TECHNICAL FIELD

The present invention relates to wireless power transmission, and more particularly to, a wireless power transmission device for a vehicle.

BACKGROUND ART

Recently, use of mobile terminals such as electronic devices with a battery rechargeable with external power, e.g., mobile phones, smart phones, tablet PCs, notebook computers, digital broadcasting terminals, personal digital assistants (PDAs), portable multimedia players (PMPs) and navigation devices, is becoming more widespread. Such mobile terminals are frequently used in dynamic spaces such as vehicles.

Accordingly, a wireless power transmission device for a vehicle is embedded into a vehicle to transmit electric energy supplied from a power source of the vehicle according to a wireless transmission method. Thus, a battery of a mobile terminal may be charged with wireless power transmitted from the wireless power transmission device for the vehicle.

As an example of such a contactless method, a charging method using a magnetic induction method has been widely used. That is, the charging method using the magnetic induction method is a method of charging a battery of a mobile terminal through inductive coupling between a primary coil included in a wireless power transmission device for a vehicle and a secondary coil included in a wireless power reception module when the mobile terminal approaches the wireless power transmission device embedded in a vehicle.

In this case, the wireless power transmission device for a vehicle includes an outer case and a cover coupled to the outer case to be embedded in the vehicle, and the outer case is formed of aluminum for heat dissipation.

However, although a certain extent of a heat dissipation effect can be expected owing to the outer case formed of aluminum, there is a limit in lowering a surface temperature of the cover with which the mobile terminal is in direct contact.

DISCLOSURE

Technical Problem

To address the above problem, the present invention is directed to providing a wireless power transmission device for a vehicle, in which a surface temperature of a cover is lowered by blocking the transfer of heat through an insulating layer.

Technical Solution

According to one aspect of the present invention, a wireless power transmission device, for a vehicle, includes a wireless power transmission module including at least one wireless power transmission antenna for transmitting wireless power, and a magnetic-field shielding sheet disposed on one surface of the at least one wireless power transmission antenna; a heat dissipation case configured to discharge heat generated from a heat source, wherein the wireless power transmission module is coupled to one side of the heat dissipation case and at least one circuit board for driving the wireless power transmission module is embedded in the heat dissipation case; a heat dissipation plate provided between the wireless power transmission module and the heat dissipation case and configured to dissipate heat generated from the at least one wireless power transmission antenna; an insulating layer disposed on one surface of the heat dissipation plate and configured to block transfer of heat between the heat dissipation case and the heat dissipation plate; and a cover detachably coupled to the heat dissipation case.

The insulating layer may be one of an insulating sheet containing hollow silica particles, a nanofiber web with fine pores, and a coating layer formed by coating at least one surface of the heat dissipation plate with a heat reflection material.

The heat dissipation plate may be formed of a metal material and may be in the form of a plate. For example, the heat dissipation plate may be a metal plate including at least one of copper and aluminum.

The heat dissipation plate may be fixed onto one surface of the heat dissipation case through a fastening member.

The heat dissipation case may be connected to a body of a vehicle via a ground cable.

The heat dissipation case may be formed of a metal material or a heat dissipation plastic material into which a metal plate is embedded.

The heat dissipation case may include a heat dissipation coating layer applied onto an outer surface thereof.

The at least one wireless power transmission antenna may be a coil member and the coil member may be a flat coil.

Advantageous Effects

According to the present invention, a surface temperature of a cover can be effectively lowered by blocking transfer of heat between a coil part and a circuit board part due to an insulating layer, and a fastening property and a problem caused by generation of heat can be improved.

MODES OF THE INVENTION

Figure 1:
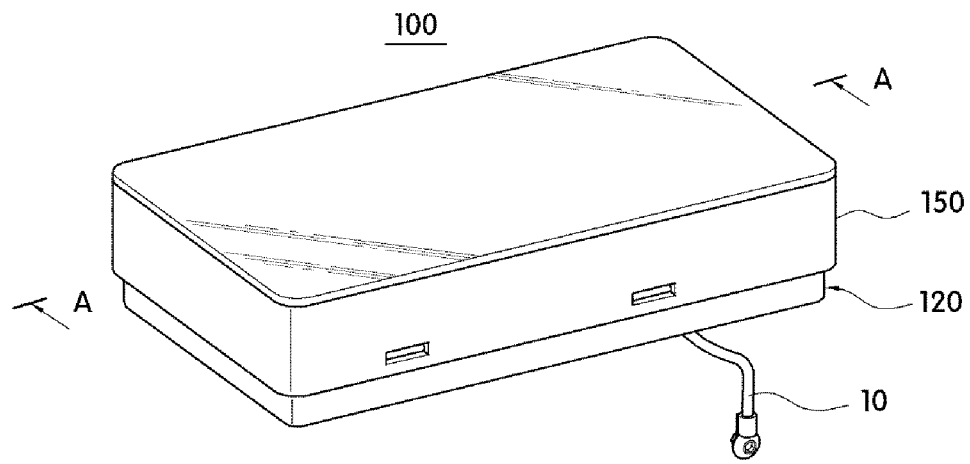
FIG. 1 is a diagram illustrating a wireless power transmission device for a vehicle according to one embodiment of the present invention.

Hereinafter, embodiments of the present invention will be described in detail with reference to the accompanying drawings below so that they may be easily implemented by those of ordinary skill in the art. However, the present invention may be embodied in many different forms and is not limited to the embodiments set forth herein. For clarity, parts not related to explaining the present invention are omitted in the drawings, and the same reference numerals are allocated to the same or like components throughout the specification.

Figure 2:
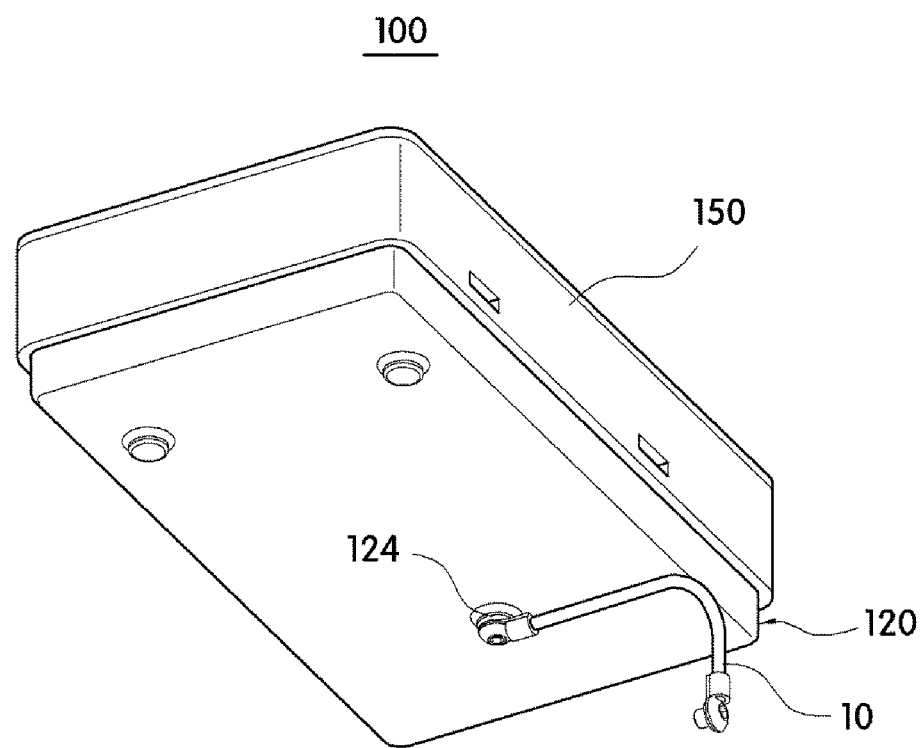
FIG. 2 is a bottom view of FIG. 1.

A wireless power transmission device 100 for a vehicle according to one embodiment of the present invention may include a heat dissipation case 120 and a cover 150 as illustrated in FIGS. 1 and 2, and a wireless power transmission module, a heat dissipation plate 130 and an insulating layer 140 may be disposed between the heat dissipation case 120 and the cover 150.

The wireless power transmission module may transmit wireless power to an electronic device to be charged. To this end, the wireless power transmission module may include at least one wireless power transmission antenna, e.g., wireless power transmission antennas 111, 112, and 113, and a magnetic-field shielding sheet 114.

Specifically, the wireless power transmission antennas 111, 112, and 113 may serve as primary coils for transmitting wireless power when power is supplied thereto. In this case, an additional receiving antenna (e.g., a secondary coil (Rx coil)) corresponding to the wireless power transmission antennas 111, 112, and 113 may be embedded in the electronic device. Furthermore, the electronic device may be a portable electronic device such as a mobile phone, a PDA, a PMP, a tablet PC, a multimedia device, or the like.

Accordingly, the secondary coil may receive the wireless power transmitted from the wireless power transmission antennas 111, 112, and 113, and a main battery of the electronic device may be charged with the wireless power received through the secondary coil.

In the present invention, the wireless power transmission antennas 111, 112, and 113 may be operated by a Qi method, a PMA method or an A4WP method or operated by switching between two or more methods among the Qi method, the PMA method, and the A4WP method according to a method of operating the wireless power receiving module approaching to the wireless power transmission antennas 111, 112, and 113.

The wireless power transmission antennas 111, 112, and 113 may be coil members manufactured by winding a conductive member having a certain length in a clockwise or counterclockwise direction a plurality of times, and both ends of each of them may serve as a pair of connection terminals 111a, 112a, or 113a. Furthermore, the wireless power transmission antenna may be provided as one antenna or a plurality of antennas. In addition, the wireless power transmission antennas 111, 112, and 113 may be flat coils having a circular, elliptical, or quadrangular shape or be solenoid coils.

In this case, in the wireless power transmission device 100 according to one embodiment of the present invention, when the wireless power transmission antennas 111, 112, and 113 are a plurality of flat coils, at least some of the plurality of flat coils may be stacked to overlap each other. For example, the wireless power transmission antennas 111, 112, and 113 may be embodied as three flat coils.

Figure 3:
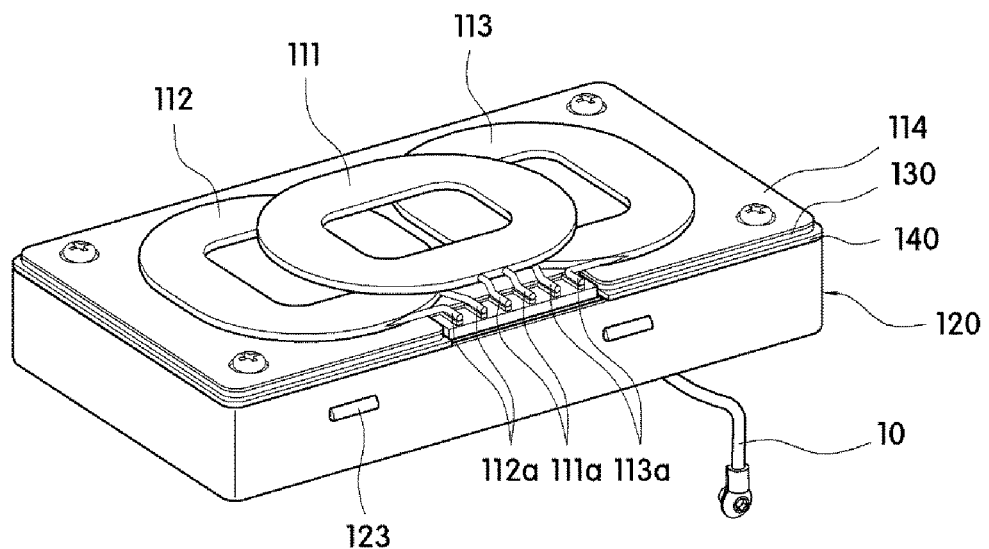
FIG. 3 is a view illustrating a state in which a cover is removed from FIG. 1.

In this case, as illustrated in FIG. 3, any one 111 among the three coil members 111, 112, and 113 may be disposed on the upper portion of the other two coil members 112 and 113 to partially overlap the other two coil members 112 and 113.

However, the number and arrangement of the wireless power transmission antennas 111, 112, and 113 are not limited thereto and may be appropriately changed according to design conditions.

In addition, although in the drawings and description the wireless power transmission antennas 111, 112, and 113 are provided as examples of a primary coil for transmitting wireless power, the present invention is not limited thereto and the primary coil may be an antenna pattern formed on one surface of a circuit board using copper foil or conductive ink.

The magnetic-field shielding sheet 114 may be disposed on one surface of the wireless power transmission antennas 111, 112, and 113 and may shield a magnetic field generated by the wireless power transmission antennas 111, 112, and 113 and focus the magnetic field in a desired direction.

The magnetic-field shielding sheet 114 may be a plate member having a certain area. In this case, the magnetic-field shielding sheet 114 may be formed of a material having magnetic properties to shield a magnetic field and focus the magnetic field in a desired direction.

For example, the magnetic-field shielding sheet 114 may be a ribbon sheet including at least one of an amorphous alloy and a nano crystal alloy, a ferrite sheet, a polymer sheet, or the like.

Here, the amorphous alloy may be a Fe-based or Co-based magnetic alloy, and the ferrite sheet may be a sintered ferrite sheet including at least one of Mn—Zn ferrite and Ni—Zn ferrite.

Furthermore, the magnetic-field shielding sheet 114 may be formed to be divided into a plurality of pieces through a flake process or may be a multilayer sheet in which a plurality of sheets is stacked in multiple layers.

Because the magnetic-field shielding sheet 114 is a well-known structure, a detailed description thereof will be omitted herein and any of well-known materials commonly used as a shielding sheet may be used therefor. Furthermore, the magnetic-field shielding sheet 114 may have a bar shape having a certain length and an overall shape thereof may be appropriately changed according to the shape of the wireless power transmission antennas 111, 112, and 113.

At least one circuit board, e.g., circuit boards 161 and 162, may be accommodated in the heat dissipation case 120 and the at least one circuit board 161 or 162 may control overall driving of the wireless power transmission module by electrically connected to the wireless power transmission antennas 111, 112, and 113 for overall control of.

Here, various circuit elements for overall control of the driving of the wireless power transmission module may be mounted on the circuit boards 161 and 162 and the circuit boards 161 and 162 may be provided as one circuit board or a plurality of circuit boards.

For example, the heat dissipation case 120 may include a box shape main body 121 with an accommodation space having the upper portion of which is open so as to embed the circuit boards 161 and 162 therein, and the open upper portion of the accommodation space may be covered with a cover plate 122 provided in the form of a plate having a certain area.

The cover plate 122 may be detachably coupled to the main body 121 through a fastening member 128. In addition, the wireless power transmission module may be fixed to one surface of the cover plate 122.

In this case, the heat dissipation case 120 may be formed of a material having high thermal conductivity so that heat generated from a heat source such as the circuit boards 161 and 162 may be discharged to the outside during driving.

For example, the heat dissipation case 120 may be formed of a metal material such as copper or aluminum.

Alternatively, the heat dissipation case 120 may be formed of a heat dissipation plastic material. In the present invention, the heat dissipating plastic material may be a product injection-molded using a heat dissipating member forming composition including a graphite composite but is not limited thereto and any of well-known heat dissipating plastics having heat dissipation property may be used therefor.

Figure 6:
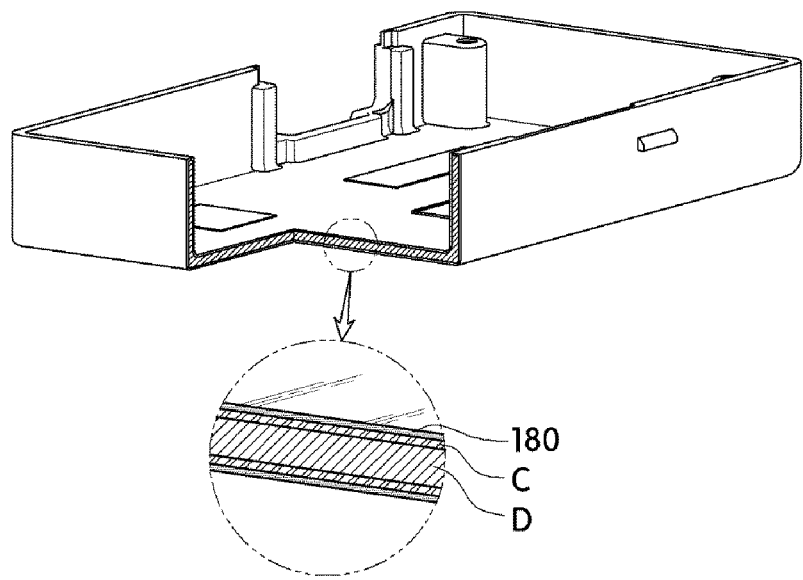
FIG. 6 illustrates an example of a heat dissipation case applicable to the present invention in which a part of a main body of the heat dissipation case is cut when the heat dissipation case is a heat dissipation plastic case having a metal plate embedded therein.

As another alternative, as illustrated in FIG. 6, the heat dissipation case 120 may be formed by integrating a metal plate D, such as a copper or aluminum plate, and a heat dissipation member forming composition C including a graphite composite by insert-injection molding.

Accordingly, in the wireless power transmission device 100 according to one embodiment of the present invention, heat generated from a heat source such as the circuit boards 161 and 162 during driving may be transferred to the heat dissipation case 120, and the heat transferred to the heat dissipation case 120 may be discharged to the outside.

As described above, a side of the heat dissipation case 120 may be detachably coupled to the cover 150. That is, the cover 150 may have a box shape, one side of which is open, and be coupled to the heat dissipation case 120 such that upper portions of the wireless power transmission antennas 111, 112, and 113 are covered with the open side of the cover 150. Thus, the wireless power transmission antennas 111, 112, and 113 disposed on one surface of the heat dissipation case 120 may be prevented from being exposed to the outside due to the cover 150.

For example, the heat dissipation case 120 may include at least one flange 123 formed on an outer surface thereof, and an edge of the open side of the cover 150 may be hooked by the flange 123. Therefore, the cover 150 may be detachably coupled to the heat dissipation case 120.

The heat dissipation plate 130 may be a plate type member having a certain area and be disposed on one surface of the magnetic-field shielding sheet 114. The heat dissipation plate 130 may be attached to one surface of the magnetic-field shielding sheet 114 via an adhesive layer (not shown) including a thermally conductive component.

In this case, at least one assembly hole 132 through which the fastening member 128 passes may be formed to pass through the heat dissipation plate 130. Accordingly, the heat dissipation plate 130 may be fastened to the heat dissipation case 120 through the fastening member 128 such as a bolt member.

The heat dissipation plate 130 may be formed of a metal material having high thermal conductivity, such as copper or aluminum. Thus, the heat dissipation plate 130 is capable of not only serving as a support for supporting the magnetic-field shielding sheet 114 but also dissipating heat generated from the wireless power transmission antennas 111, 112, and 113 fixed to one surface of the magnetic-field shielding sheet 114.

Accordingly, in the wireless power transmission device 100 according to one embodiment of the present invention, when the magnetic-field shielding sheet 114 is a sheet having low strength or having flexibility such as a ferrite sheet or a polymer sheet, the magnetic-field shielding sheet 114 may be supported by the heat dissipation plate 130 formed of a metal material having a certain degree of strength.

Therefore, even when the magnetic-field shielding sheet 114 is a low-strength or flexible sheet such as a ferrite sheet or a polymer sheet, assemblability and fastenability between the magnetic-field shielding sheet 114 and the heat dissipation case 120 when assembled together may be improved.

In addition, since the heat dissipation plate 130 is disposed on one surface of the magnetic-field shielding sheet 114, heat generated from the wireless power transmission antennas 111, 112, and 113 may be transmitted to the heat dissipation plate 130 via the magnetic-field shielding sheet 114 and then be dissipated.

Accordingly, in the wireless power transmission device 100 for a vehicle according to one embodiment of the present invention, when heat is generated from the wireless power transmission antennas 111, 112, and 113 during operation, a thermal exchange rate between the heat generated from the wireless power transmission antennas 111, 112, and 113 and air present inside the cover 150 may be reduced.

Therefore, in the wireless power transmission device 100 according to one embodiment of the present invention, temperature of the air inside the cover 150 may be lower than that when the heat dissipation plate 130 is not provided.

Thus, the amount of heat transferred to the cover 150 through the air present inside the cover 150 may be reduced, and as a result, a surface temperature of the cover 150 may be lower than that when the heat dissipation plate 130 is not provided.

In this case, in the wireless power transmission device 100 for a vehicle according to one embodiment of the present invention, the insulating layer 140 may be disposed on one surface of the heat dissipation plate 130.

The insulating layer 140 may be disposed between the heat dissipation plate 130 and the heat dissipation case 120 and block contact between the heat dissipation plate 130 and the heat dissipation case 120. Accordingly, transfer of heat between the heat dissipation plate 130 and the heat dissipation case 120 may be prevented due to the insulating layer 140.

Therefore, in the wireless power transmission device 100 for a vehicle according to one embodiment of the present invention, when heat generated in the circuit boards 161 and 162 and heat generated in the wireless power transmission antennas 111, 112, and 113 have different temperatures during operation, the transfer of the heat from a relatively high-temperature portion to a low-temperature portion may be blocked for thermal equilibrium.

That is, in the wireless power transmission device 100 for a vehicle according to one embodiment of the present invention, heat generated from the wireless power transmission antennas 111, 112, and 113 may be dissipated through the heat dissipation plate 130 and heat generated from the circuit boards 161 and 162 may be discharged to the outside through the heat dissipation case 120 as described above.

In addition, in the wireless power transmission device 100 for a vehicle according to one embodiment of the present invention, the transfer of heat may be blocked through the insulating layer 140 even though a temperature of heat generated from the circuit boards 161 and 162 is higher than that of heat generated from the wireless power transmission antennas 111, 112, and 113 and thus a temperature difference occurs between both sides of the insulating layer 140.

Accordingly, in the wireless power transmission device 100 for a vehicle according to one embodiment of the present invention, the transfer of heat from the heat dissipation case 120 having a relatively high temperature to the heat dissipation plate 130 having a relatively low temperature may be basically prevented.

Thus, in the wireless power transmission device 100 for a vehicle according to one embodiment of the present invention, heat generated from the circuit boards 161 and 162 may be prevented from being transferred to the cover 150 through the insulating layer 140 and thus may be transmitted only to the heat dissipation case 120 by conduction and convection, and air inside the heat dissipation case 120 heated by the heat generated from the circuit boards 161 and 162 may flow only inside the heat dissipation case 120.

Accordingly, even when the temperature of the heat generated from the circuit boards 161 and 162 is higher than that of the heat generated from the wireless power transmission antennas 111, 112, and 113, effects which may increase the temperature of the air present inside the cover 150 may be minimized or blocked basically. Thus, the surface temperature of the cover 150 may be prevented from being increased by the heat generated from the circuit boards 161 and 162.

Accordingly, in the wireless power transmission device 100 for a vehicle according to one embodiment of the present invention, since air present inside the cover 150 is heated only by part of heat generated from the wireless power transmission antennas 111, 112, and 113, which is lower in temperature than heat generated from the circuit boards 161 and 162, an increase in the surface temperature of the cover 150 may be reduced.

The insulating layer 140 may be provided in the form of a plate type sheet or film or may be a coating layer coated on one surface of the heat dissipation plate 130.

As a specific example, the insulating layer 140 may be an insulating sheet containing hollow silica particles. Alternatively, the insulating layer 140 may be a nanofiber web formed to have fine pores using nanofiber formed of a polymer resin. As another alternative, the heat insulating layer 140 may be a coating layer formed by coating at least one surface of the heat dissipation plate 130 with a heat reflecting material.

However, the insulating layer 140 is not limited thereto and any of well-known insulating materials or insulating sheets used for the purpose of heat insulation may be used therefor. The insulating layer 140 may also serve as a dielectric layer.

Figure 5:
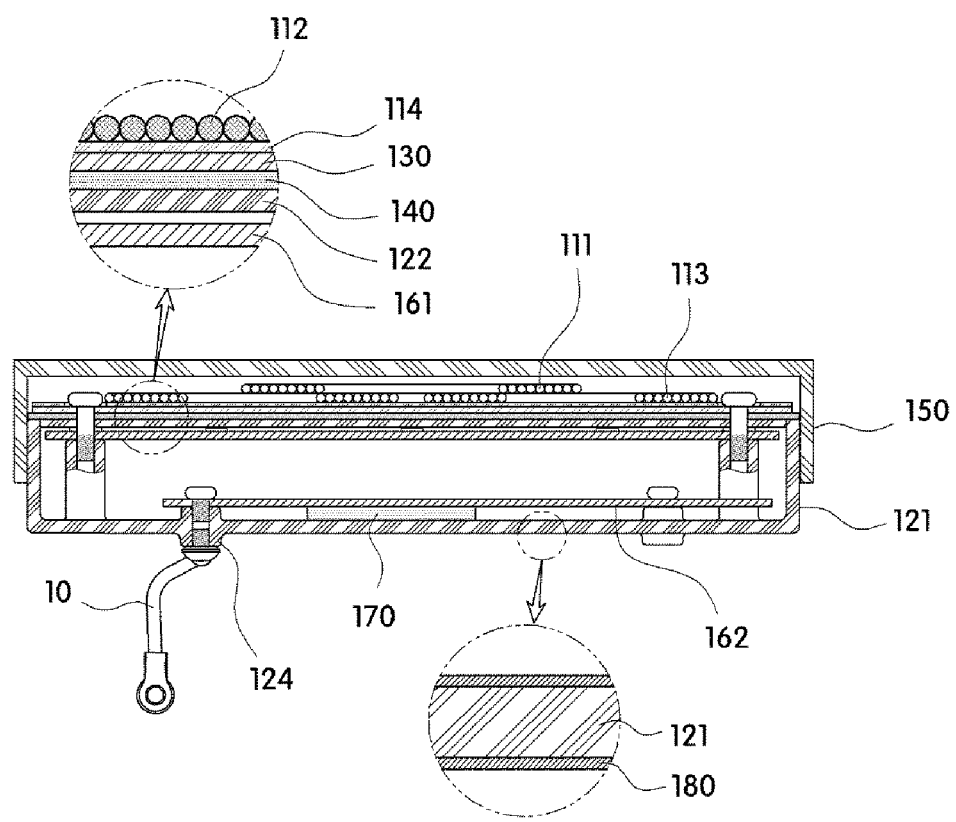
FIG. 5 is a cross-sectional view taken along line A-A of FIG. 1.

Meanwhile, the heat dissipation case 120 applicable to the present invention may include a heat dissipation coating layer 180 to implement more excellent heat dissipation as illustrated in FIGS. 5 and 6. Thus, the wireless power transmission device 100 for a vehicle according to one embodiment of the present invention may further decrease the surface temperature of the cover 150 on which an electronic device to be charged is placed.

That is, the heat dissipation coating layer 180 may be a coating layer formed to a certain thickness on a surface of the heat dissipation case 120 and thus may further increase overall heat dissipation capability of the heat dissipation case 120.

Thus, the wireless power transmission device 100 for a vehicle according to one embodiment of the present invention may further decrease the surface temperature of the cover 150 heated by heat generated from a heat source during operation.

Accordingly, since the cover 150 is not heated to a high temperature, discomfort that a user may feel at a high temperature may be reduced even when the user's body is in contact with the surface of the cover 150.

As a non-restrictive example, the heat dissipation coating layer 180 may include a coating layer forming component containing a main resin, a carbon-based filler, and a property enhancement component for improving heat dissipation and adhesion properties.

However, the heat dissipation coating layer 180 is not limited thereto and may be any of well-known heat dissipation coating layers used for heat dissipation.

Figure 4:
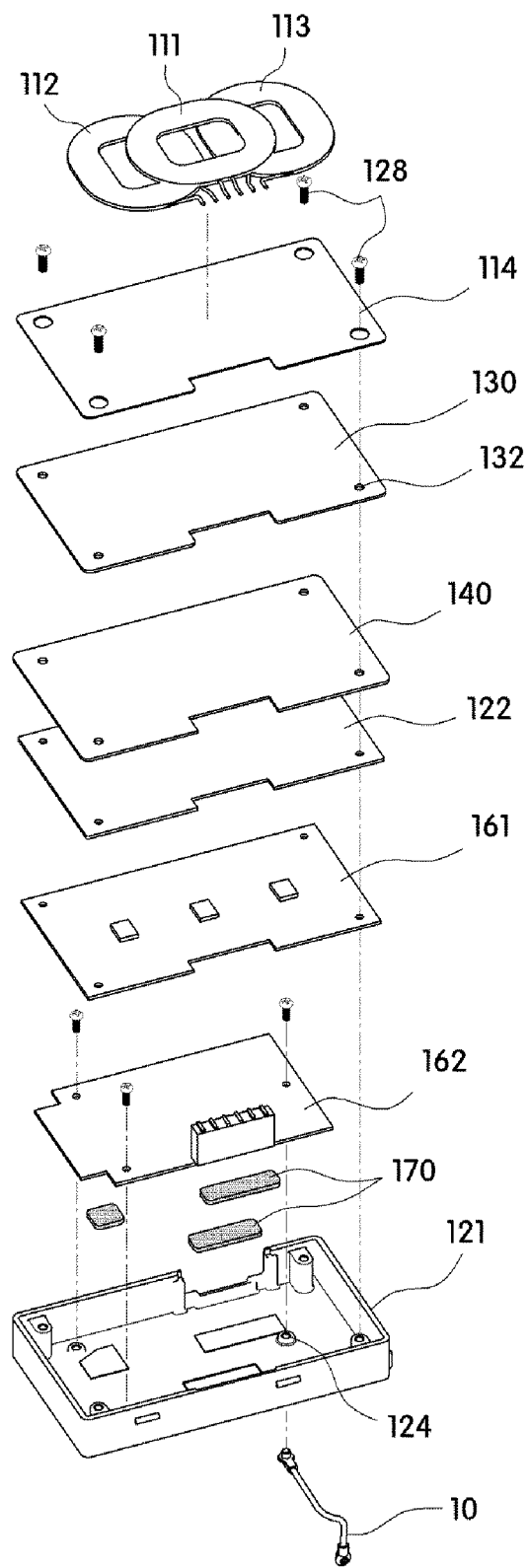
FIG. 4 is an exploded view of FIG. 3.

Meanwhile, the wireless power transmission device 100 for a vehicle according to one embodiment of the present invention may include a heat transfer member 170 disposed on a bottom surface of the heat dissipation case 120 as illustrated in FIGS. 4 and 5.

The heat transfer member 170 may be disposed such that one surface thereof is in contact with the bottom surface of the heat dissipation case 120 and another surface thereof may be in contact with the circuit board 162 disposed inside the heat dissipation case 120. Thus, heat generated from the circuit board 162 may be smoothly transferred to the heat dissipation case 120 through the heat transfer member 170.

In this case, the heat transfer member 170 may be disposed in a region corresponding to a heat generating element such as an integrated circuit (IC) mounted on the circuit board 162. Thus, the heat transfer member 170 may smoothly transfer heat generated from the heat generating element to the heat dissipation case 120.

The heat transfer member 170 may be in the form of a pad manufactured by hardening a heat dissipation composition including at least one of a thermally conductive filler and a phase-change material. Alternatively, the heat transfer member 170 may be a form manufactured by directly applying the heat-dissipating forming composition, including at least one of the phase-change material and the thermally conductive filler, to a certain thickness to a bottom surface of the heat dissipation case 120 and hardening the heat-dissipation forming composition.

The above-described wireless power transmission device 100 for a vehicle may be embedded in a vehicle such that one surface of the cover 150 coupled with the heat dissipation case 120 may be exposed to the outside. For example, the wireless power transmission device 100 for a vehicle may be embedded in a gearbox of the vehicle.

Figure 7:
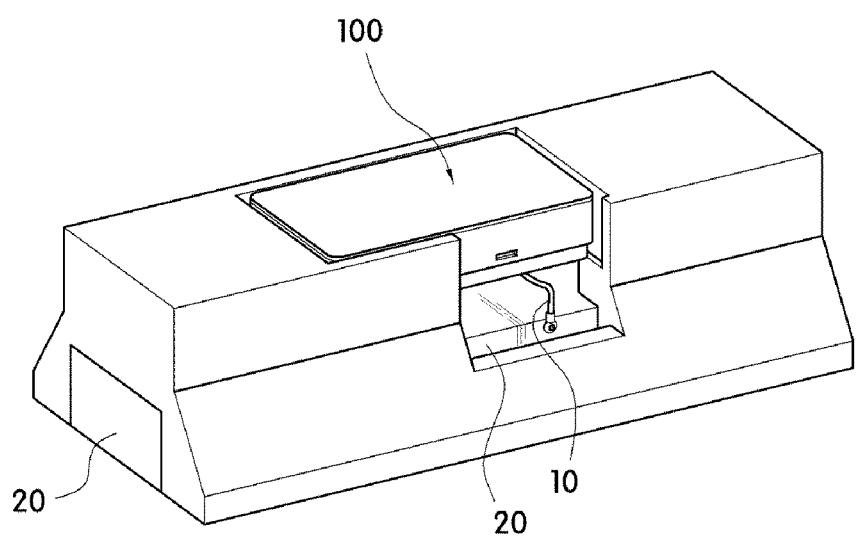
FIG. 7 is a schematic diagram illustrating a state in which a wireless power transmission device for a vehicle according to one embodiment of the present invention is installed in a vehicle.

In this case, the heat dissipation case 120 may be connected to a body 20 of the vehicle formed of a metal material via a ground cable 10 as illustrated in FIG. 7.

Therefore, in the wireless power transmission device 100 for a vehicle according to one embodiment of the present invention, in a case in which the heat dissipation case 120 includes a metal material, electromagnetic waves generated from the circuit boards 161 and 162 may be absorbed by the heat dissipation case 120 and then electromagnetic waves absorbed by the heat dissipation case 120 may be transferred to the body 20 of the vehicle through the ground cable 10.

Accordingly, in the wireless power transmission device 100 for a vehicle according to one embodiment of the present invention, shielding performance of blocking electromagnetic waves generated from the circuit boards 161 and 162 may be improved. Therefore, the wireless power transmission device 100 for a vehicle according to one embodiment of the present invention is capable of preventing or minimizing a decrease in charging efficiency caused by electromagnetic waves generated from the circuit boards 161 and 162.

To this end, the heat dissipation case 120 may include a fastening hole 124 formed in the bottom of the body 121 and an end of the ground cable 10 may be fastened with the fastening hole 124.

Therefore, one end of the ground cable 10 may be fixed with the fastening hole 124 of the main body 121 and another end thereof may be fixed onto the body 20 of the vehicle. Accordingly, the ground cable 10 may connect the bottom of the heat dissipation case 120 and the body 20 of the vehicle to each other.

However, the connection relationship between the ground cable 10 and the heat dissipation case 120 is not limited thereto, and a position of the heat dissipation case 120 connected to the ground cable 10 may be appropriately changed according to design conditions.

Although an example of the wireless power transmission device for a vehicle 100 according to one embodiment of the present invention in which the heat dissipation case 120 includes the box shape main body 121, the upper portion of which is open, and the cover plate 122 is illustrated and described above, the present invention is not limited thereto and the cover plate 122 may be omitted. In this case, the heat dissipation plate 130 with the insulating layer 140 may replace the cover plate 122 and may be in a form covering the open upper portion of the main body 121.

While embodiments of the present invention have been described above, the scope of the present invention is not limited thereto, and other embodiments may be easily derived by those of ordinary skill in the art who understand the spirit of the present invention by adding, changing, or deleting elements without departing from the scope of the present invention.

The invention claimed is:

1. A wireless power transmission device for a vehicle, comprising:
   a wireless power transmission module including at least one wireless power transmission antenna for transmitting wireless power, and a magnetic-field shielding sheet disposed on one surface of the at least one wireless power transmission antenna;
   a heat dissipation case configured to discharge heat generated from a heat source, wherein the wireless power transmission module is coupled to one side of the heat dissipation case and at least one circuit board for driving the wireless power transmission module is embedded in the heat dissipation case, wherein the heat dissipation case is formed of a metal material to absorb electromagnetic waves generated from the at least one circuit board;
   a heat dissipation plate disposed between the wireless power transmission module and the heat dissipation case and configured to dissipate heat generated from the at least one wireless power transmission antenna;
   an insulating layer disposed on one surface of the heat dissipation plate and configured to block transfer of heat between the heat dissipation case and the heat dissipation plate;
   a cover detachably coupled to the heat dissipation case; and
   a ground cable connecting the heat dissipation case and a body of a vehicle to each other, wherein the heat dissipation case includes a fastening hole to which an end of the ground cable is fastened so that the electromagnetic waves absorbed by the heat dissipation case can be transferred to the body of the vehicle through the ground cable,
   wherein the insulating layer is disposed between the heat dissipation case and the heat dissipation plate to prevent the heat dissipation plate from coming into direct contact with the heat dissipation case,
   wherein the insulating layer is disposed between the heat dissipation plate and the at least one circuit board and is configured to block transfer of heat between the heat dissipation plate and the at least one circuit board,
   wherein as transfer of heat between the heat dissipation plate and the heat dissipation case is prevented due to the insulating layer, heat generated from the wireless power transmission antennas is dissipated through the heat dissipation plate, and heat generated from the circuit boards is discharged to an outside of the wireless power transmission device through the heat dissipation case,
   wherein the heat dissipation case includes a box shape main body with an accommodation space,
   wherein an upper portion of the accommodation space is open so as to embed the at least one circuit board, and covered with a cover plate provided in the form of a plate having a certain area, and
   wherein the cover plate is disposed between the insulating layer and the at least one circuit board.

2. The wireless power transmission device of claim 1, wherein the insulating layer is any one of an insulating sheet containing hollow silica particles, a nanofiber web with fine pores, and a coating layer formed by coating at least one surface of the heat dissipation plate with a heat reflection material.

3. The wireless power transmission device of claim 1, wherein the heat dissipation plate is formed of a metal material and is in the form of a plate.

4. The wireless power transmission device of claim 3, wherein the heat dissipation plate includes at least one of copper and aluminum.

5. The wireless power transmission device of claim 1, wherein the heat dissipation plate is fixed onto one surface of the heat dissipation case via a fastening member.

6. The wireless power transmission device of claim 1, wherein the heat dissipation case further comprises a heat dissipation coating layer applied onto an outer surface thereof.

7. The wireless power transmission device of claim 1, wherein the at least one wireless power transmission antenna is a coil member.

8. The wireless power transmission device of claim 7, wherein the coil member is a flat coil.

* * * * *